United States Patent
Brooks

(12) 
(10) Patent No.: US 6,189,436 B1
(45) Date of Patent: Feb. 20, 2001

(54) RADIAL BELLCRANK ACTUATOR

(76) Inventor: Richard L. Brooks, 4601 Miles Dr., Port Orange, FL (US) 32127

(*) Notice: Under 35 U.S.C. 154(b), the term of this patent shall be extended for 0 days.

(21) Appl. No.: 09/185,772

(22) Filed: Nov. 3, 1998

(51) Int. Cl.[7] .................................................. F01B 9/00
(52) U.S. Cl. ............................................................ 92/138
(58) Field of Search .................................................. 92/138

(56) References Cited

U.S. PATENT DOCUMENTS

| | | | |
|---|---|---|---|
| 403,601 | * 5/1889 | McAllister | 92/138 X |
| 1,119,758 | * 12/1914 | Kings | 92/138 X |
| 1,229,443 | * 6/1917 | Hall et al. | 92/138 X |
| 1,686,339 | * 10/1928 | Murray | 92/138 |
| 2,138,148 | * 11/1938 | Eckert | 92/138 X |
| 2,688,258 | * 9/1954 | Haynes et al. | 92/138 X |
| 2,928,375 | * 3/1960 | Herrmann | 92/138 X |
| 2,932,168 | * 4/1960 | Rockwell | 92/138 X |
| 3,003,428 | * 10/1961 | Christenson | 92/138 X |
| 4,193,337 | 3/1980 | Disdier . | |
| 4,230,025 | 10/1980 | Caliri . | |
| 4,882,977 | * 11/1989 | Himeno et al. | 92/138 X |
| 4,905,574 | 3/1990 | Trevisan . | |
| 5,385,218 | 1/1995 | Migliori . | |
| 5,492,050 | 2/1996 | Holtgraver . | |

FOREIGN PATENT DOCUMENTS

| | | | | |
|---|---|---|---|---|
| 1200733 | * 12/1959 | (FR) | | 92/138 |
| 561264 | * 4/1957 | (IT) | | 92/138 |
| 58-131412 | * 8/1983 | (JP) | | 92/138 |
| 872800 | * 10/1981 | (RU) | | 92/138 |
| 172820 | * 9/1960 | (SE) | | 92/138 |

* cited by examiner

*Primary Examiner*—John E. Ryznic
(74) *Attorney, Agent, or Firm*—Paul S. Rooy, P.A.

(57) ABSTRACT

A radial bellcrank actuator comprising a piston with a circumferential piston groove, and a bellcrank attached to an output shaft. The bellcrank has a bellcrank piston lobe at one end, and a bellcrank output shaft lobe at the other. The bellcrank piston lobe is attached to the bellcrank output shaft lobe at a bellcrank waist. The bellcrank piston lobe is sized to fit into the piston groove, such that reciprocation of the piston causes rotation of the bellcrank and attached output shaft. Relationships between the dimensions of the bellcrank lobes, the distance between their centers, the thickness of the bellcrank piston lobe, and the waist width are disclosed, which permit the preferred embodiment radial bellcrank actuator to provide up to 90 degrees of rotation. Thus, the instant invention is economical, simple, long-lasting and provides symmetrical loading to its components.

20 Claims, 3 Drawing Sheets

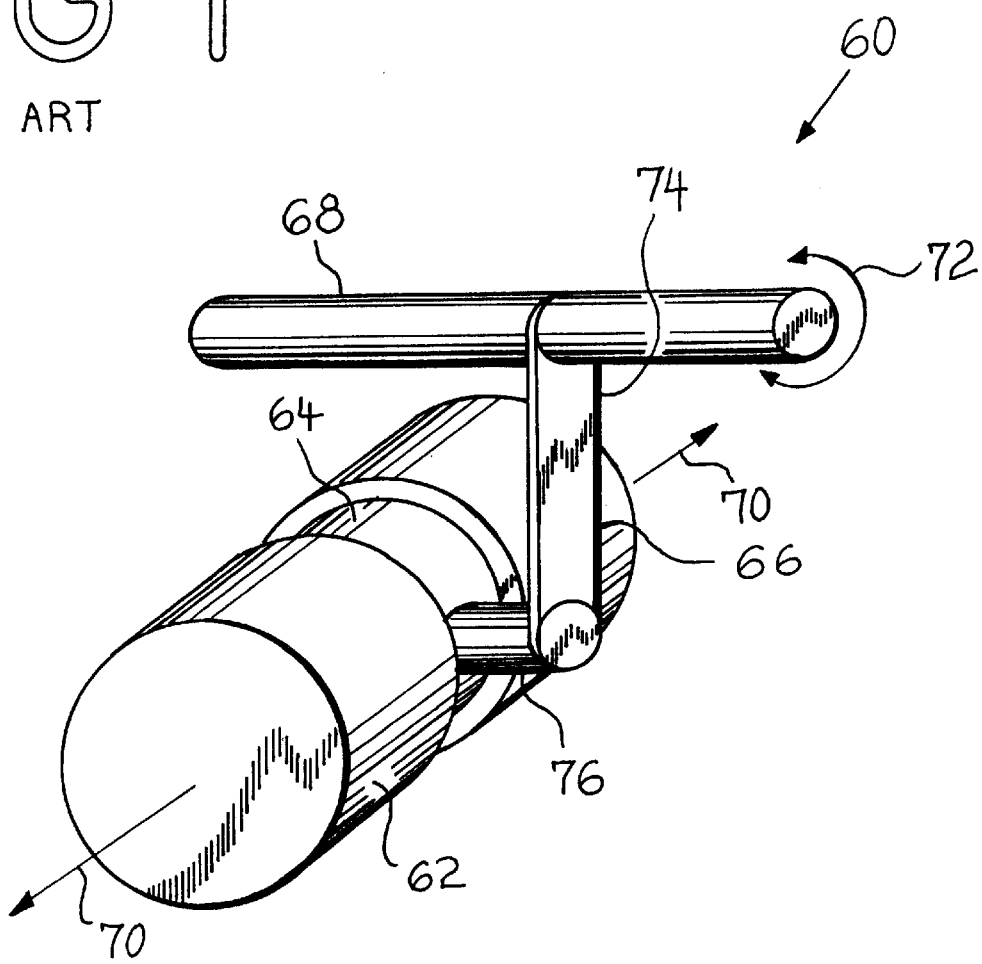

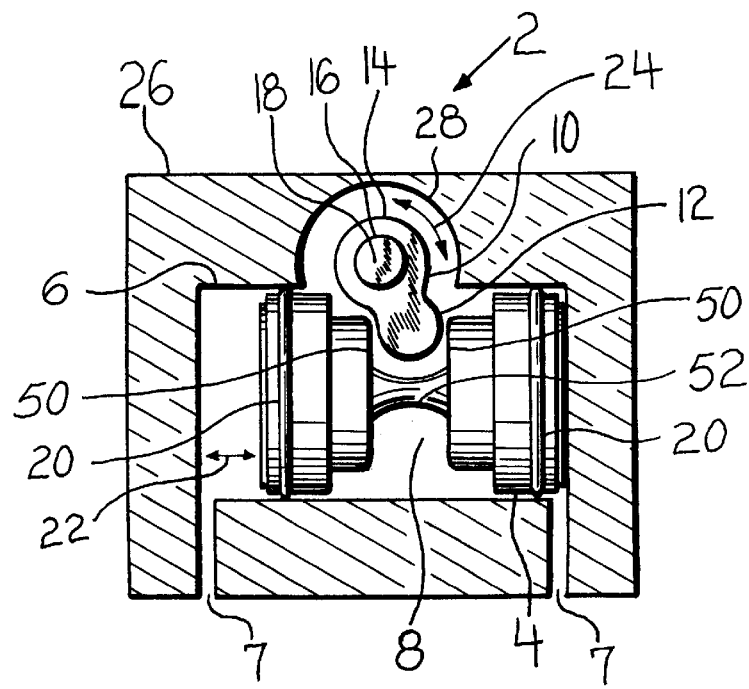
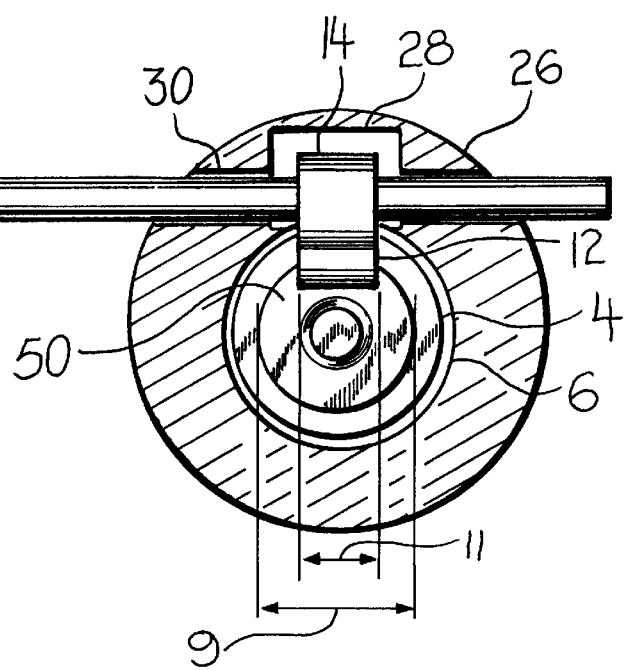

RADIAL BELLCRANK ACTUATOR

BACKGROUND OF THE INVENTION

1. Field of the Invention

This invention relates to fluid power rotary actuators, and in particular to a radial bellcrank actuator.

2. Background of the Invention

Fluid power actuators enjoy considerable popularity in a wide variety of industrial applications, especially in automation and numerical control machines. Either pneumatic or hydraulic fluid may be used to power these actuators.

The most common applications for rotary actuators are in automation where they perform functions such as turning valves, rotating products, positioning diverting arms, bending products, etc. They are also used in animation, process control (primarily valve actuation), vehicle control such as rudders or flaps, robotics, agricultural and other mobile equipment, etc.

A typical rotary fluid power actuator system comprises a cylinder within which a piston is free to reciprocate. A pressurized fluid supply is alternately connected to either a first cylinder end or a second cylinder end through a directional control valve and cylinder ports. The piston is driven away from the cylinder end to which the pressurized fluid supply is connected. A flow control valve may be connected to each cylinder end to control the flow rate of fluid escaping from the cylinder ahead of the piston, which in effect controls the piston speed during most of the stroke.

Means is provided to convert the linear reciprocating motion of the piston into rotary motion of an output shaft, which is attached to the load to be moved. The rotary motion of the output shaft is rotationally reciprocal, and is generally limited to an amount less than one full rotation up to as much as a few rotations, rather than unlimited rotation as in the motion produced by a motor.

In operation, the directional control valve permits fluid at driving pressure to flow into a first cylinder end, which drives the piston towards an opposite, second cylinder end. The speed at which the piston travels toward the second cylinder end (and hence the speed of rotation of the output shaft) may be controlled by the rate at which fluid is allowed to escape from the second cylinder end through the flow valve associated with the second cylinder end.

Fluid power rotary power actuato applications can be divided into categories based on their degree of positioning control. The most basic system moves to stops at each end of a fixed stroke. It is normally controlled by a single valve having two states, one corresponding to each position of the actuator. The speed of motion may be controlled by adjustable metering valves acting on the fluid stream. The torque produced can be controlled by controlling the pressure of the fluid.

At the other end of the positioning control spectrum are infinitely positionable systems in which the fluid driving the actuator is controlled by a proportional or servo valve which is part of an active control system which includes position feedback. These systems require an actuator with little or no lost motion or backlash in order to achieve accuracy.

Between these two extremes are various levels of positioning capability. Some examples are adjustable stops to limit rotation, multiple stops based on additional cylinders integrated into the actuator (generally, each stop requires an additional valve for control), and cushions which decelerate the load near the end of rotation.

EXISTING DESIGNS

A number of rotary fluid actuator designs incorporating reciprocating pistons exist within the art. U.S. Pat. Nos. 5,492,050, 5,385,218 and 4,905,574 were granted to Holtgraver, Migliori, and Trevisan respectively for rack and pinion type actuators. In these designs, a piston(s) attached to a rack(s) reciprocates as urged by fluid pressure. The rack(s) meshes with a pinion shaft, whereby rack motion causes the pinion to rotate. One disadvantage associated with the rack and pinion design is the relative complexity and cost of the assembly.

Another rotary fluid power actuator is the cable, chain or belt design. This design incorporates a flexible tension member connecting pistons which reciprocate within a cylinder, driven by fluid. The flexible member is wrapped around a pulley type member, which is attached to an output shaft, thus causing the output shaft to rotate.

The Scotch Yoke is another rotary fluid power actuator design which includes a piston reciprocating within a cylinder, pins protruding from the piston, and a yoke whose two extremes are rotatably attached to the piston pins by means of yoke slots. An output shaft is attached to the yoke, such that rotation of the yoke as urged by the piston causes the output shaft to also rotate.

U.S. Pat. No. 4,230,025 was granted Caliri for a helical drive rotary fluid power actuator. In this type of design, a piston slides within a cylinder as urged by fluid pressure. The piston and an output shaft are coaxial and have mutually mating helical features which convert the linear motion of the piston into rotary shaft motion.

Still another rotary fluid power actuator design is the barrel cam design. In this design, a piston slides in a cylinder driven by fluid pressure. The piston has a shaped slot in its outer surface which mates with a follower attached to an output shaft.

The designs described above all suffer from the disadvantages associated with complex machining required to fabricate their components. All require milling in addition to lathe work, and some require complex assembly tooling to accurately orient the various components relative to each other for attachment. These added assembly steps translate into additional assembly time, increased scrap if assembly is not accurate, and consequently, higher unit price.

Another existing rotary fluid power actuator design is illustrated in FIG. 1. FIG. 1 depicts L-bar rotary fluid power actuator 60. In this design, piston 62 reciprocates within a cylinder as indicated by arrows 70. Piston 62 comprises circumferentially disposed piston groove 64. L-bar 66 is attached to output shaft 68. L-bar 66 comprises L-bar major leg 74 rigidly attached to L-bar minor leg 76. L-bar major leg 74 is rigidly attached perpendicular to the centerline of output shaft 68. L-bar minor leg 76 is rigidly attached perpendicular to an extreme of L-bar major leg 74 opposite output shaft 68, parallel to the centerline of output shaft 68. In operation, reciprocation of piston 62 as indicated by arrows 70 causes output shaft 68 to rotate as indicated by arrow 72.

There are a number of problems associated with the design of L-bar rotary fluid power actuator 60. In order to make the required attachments, tooling must be constructed to hold L-bar major leg 74 in position perpendicular to output shaft 68, and to hold L-bar minor leg 76 parallel to the centerline of output shaft 68 and perpendicular to L-bar major leg 74. Then L-bar major leg 74 must be attached to output shaft 68, and L-bar minor leg 76 must be attached to L-bar major leg 74. In order to derive the necessary strength, these attachments must generally be made by welding or brazing. If the indexing of these parts is inaccurate, this actuator will not function correctly. Thus the L-bar rotary fluid power actuator 60 design suffers from complexity in assembly due to the number of parts involved, and the requirement for accuracy and exactness in assembling L-bar 66, and attaching same to output shaft 68. These manufacturing drawbacks translate into increased assembly time, resulting in higher unit price.

Another disadvantage associated with the L-bar rotary fluid power actuator 60 design is the small bearing area of L-bar minor leg 76 on piston groove 64. This small bearing footprint results in increased wear, and/or the requirement that harder materials be used. The use of harder materials equates with increased cost. Still another disadvantage associated with this design is the asymmetrical loading to which L-bar 66 is subjected. In our non-frictionless world, friction (and load inertia) opposing the rotation of output shaft 68 will cause L-bar minor leg 76 to try to twist out of parallel relative to output shaft 68. These same resisting forces will subject L-bar major leg 74 to twisting stress, and subject the attach points of L-bar major leg 74 to L-bar minor leg 76 and output shaft 68 to added stress. These added stresses due to the inherent asymmetry of this design will shorten the life of L-bar rotary fluid power actuator 60, and/or require the use of more or stronger materials in its construction.

Still another rotary fluid power actuator design incorporates a piston reciprocating within a cylinder. The piston is rotatably attached to a connecting rod. A crankshaft is rotatably attached to an extreme of the connecting rod opposite the piston. The configuration is similar to that of a conventional internal combustion engine piston attached to a crankshaft. This design requires a (preferably) symmetrical rotatable attachment between the connecting rod and the piston, and between the connecting rod and the crankshaft. These requirements necessitate added parts such as a piston wristpin and a complex shaped crankshaft (and/or a yoke-shaped bellcrank rigidly attached to the crankshaft and rotatably attached to the connecting rod). This design complexity translates into higher unit price.

SUMMARY OF THE INVENTION

Accordingly, it is an object of the present invention to provide a radial bellcrank actuator which is simple and easy to manufacture. Design features allowing this object to be accomplished include a bellcrank attached to an output shaft, and a grooved-piston. The grooved piston can be manufactured using only turning processes, and requires no milling. The bellcrank needn't be indexed to the output shaft when attached. Bellcrank geometry can be easily extruded. Advantages associated with the accomplishment of this object include reduced time and complexity of manufacture, decreased scrap rates because of the simple design and assembly, and consequent reduced unit cost.

It is another object of the present invention to provide a radial bellcrank actuator which provides a large bearing area between the piston and the bellcrank. Design features allowing this object to be accomplished include a bellcrank whose thickness is 40%±10% the outer diameter of the piston groove upon which it bears, and the requirement that during operation, at least 90%±10% of the bellcrank lobe thickness be in contact with the piston groove. Benefits associated with the accomplishment of this object include reduction of wear, and/or the ability to use softer (and thus, less expensive) materials.

It is still another object of this invention to provide a radial bellcrank actuator which subjects its components to symmetrical loading. Design features enabling the accomplishment of this object include an output shaft centrally attached to a bellcrank output shaft lobe, and a piston groove which bears centrally on a bellcrank piston lobe, without subjecting the bellcrank piston lobe to twisting stresses. These design features permit the elimination of bellcrank twisting stresses, and twisting stresses on the bellcrank/output shaft attach point due to asymmetrical loading. Advantages associated with the realization of this object include the reduction of wear, and/or the ability to use softer (and thus, less expensive) materials.

It is another object of the present invention to provide a radial bellcrank actuator whose output shaft is capable of rotating up to approximately 90 degrees. Design features allowing this object to be accomplished include a housing containing a bellcrank recess communicating with a cylinder, and a bellcrank having a bellcrank waist whose width is 50%±10% the cross-sectional dimension of the widest part of a bellcrank piston lobe. Benefits associated with the accomplishment of this object include increased output shaft rotation, and thus increased utility, and lowered bellcrank stresses.

It is still another object of this invention to provide a radial bellcrank actuator whose output shaft is easily attached to its bellcrank, without the need for special assembly tooling. Design features enabling the accomplishment of this object include a bellcrank output shaft bore sized to admit an output shaft. Advantages associated with the realization of this object include faster assembly and reduced unit cost.

BRIEF DESCRIPTION OF THE DRAWINGS

The invention, together with the other objects, features, aspects and advantages thereof will be more clearly understood from the following in conjunction with the accompanying drawings.

Three sheets of drawings are provided. Sheet one contains FIG. 1. Sheet two contains FIGS. 2 and 3. Sheet three contains FIGS. 4 and 5.

FIG. 1 is a front quarter isometric view of a prior art L-bar rotary fluid power actuator.

FIG. 2 is a side cross-sectional view of a radial bellcrank actuator.

FIG. 3 is an end cross-sectional view of a radial bellcrank actuator.

DETAILED DESCRIPTION OF THE PREFERRED EMBODIMENT

Figure 4:
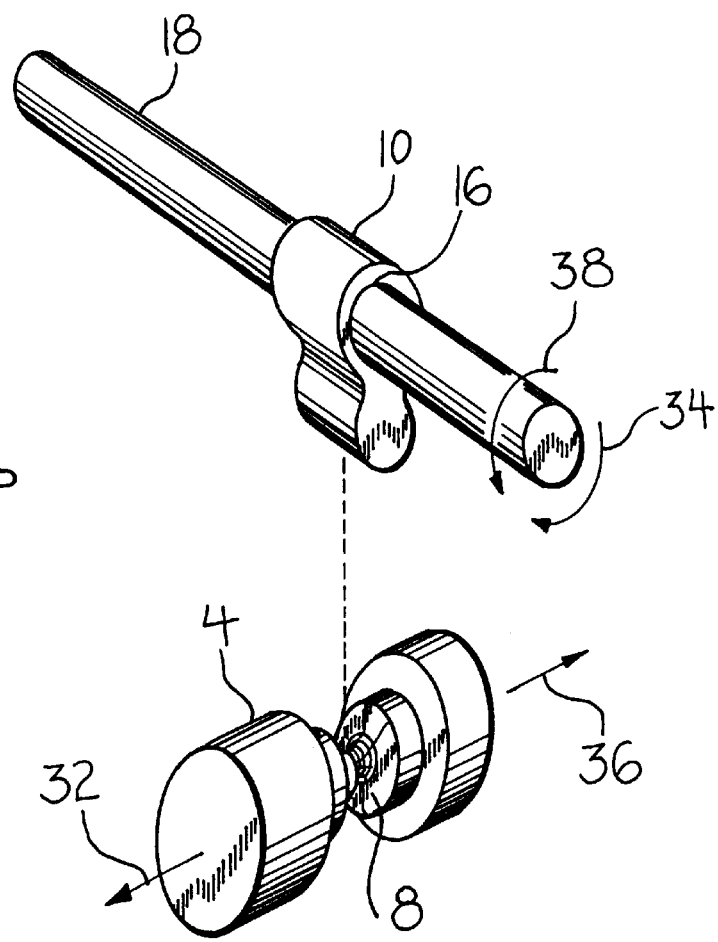
FIG. 4 is a front quarter isometric exploded view of an output shaft with bellcrank attached and a grooved piston.

FIG. 2 is a side cross-sectional view of radial bellcrank actuator 2, and FIG. 3 is an end cross-sectional view of radial bellcrank actuator 2. Referring now to these two figures, radial bellcrank actuator 2 comprises housing 26 containing cylinder 6, within which piston 4 reciprocates. Housing 26 further comprises bellcrank recess 28 communicating with cylinder 6, and output shaft bore 30 communicating with bellcrank recess 28. Output shaft 18 is rotatably disposed within output shaft bore 30. Seals 20 are used in conventional fashion throughout radial bellcrank actuator 2.

FIG. 3 is an end cross-sectional view of radial bellcrank actuator 2. As may be observed in FIG. 3, when radial bellcrank actuator 2 is viewed along a centerline of piston 4, bellcrank 10 is disposed substantially along a radius of the centerline of piston 4.

Bellcrank 10 comprises bellcrank output shaft lobe 14 rigidly attached to bellcrank piston lobe 12 at bellcrank waist 44. Bellcrank 10 is non-rotatably mounted on output shaft 18 by means of bellcrank output shaft bore 16, which is sized to admit output shaft 18. Bellcrank 10 may be attached to output shaft 18 in any number of conventional ways, e.g. welding, brazing, crimping, cementing, etc.

FIG. 4 is a front quarter isometric exploded view of output shaft 18 with bellcrank 10 attached, and piston 4 containing piston groove 8. Piston groove 8 is sized to admit bellcrank piston lobe 12, as is shown in FIGS. 2 and 3. In order to provide a wide bearing surface between piston groove 8 and bellcrank piston lobe 12, the thickness of bellcrank 10 when viewed from its side (bellcrank piston lobe thickness 11 as depicted in FIG. 3) is approximately 40% of piston groove outside diameter 9. In the preferred embodiment, bellcrank piston lobe thickness 11 was 40%±10% of piston groove outside diameter 9.

As is depicted in FIG. 2, in operation, fluid at driving pressure enters cylinder 6 through a fluid passage 7, causing piston 4 to translate as indicated by arrow 22. This piston movement in turn causes bellcrank 10 (with output shaft 18 attached) to rotate as indicated by arrow 24.

As depicted in FIG. 4, translation of piston 4 in the direction indicated by arrow 32 causes bellcrank 10 with output shaft 18 attached to rotate as indicated by arrow 34. Translation of piston 4 in the direction indicated by arrow 36 causes bellcrank 10 with output shaft 18 attached to rotate as indicated by arrow 38.

One of the design objectives of the instant invention was to provide a large bearing surface area between piston 4 and the bellcrank 10, to provide reduced stresses and consequent enhanced longevity. Accordingly, in the preferred embodiment, bellcrank piston lobe thickness 11 was 40%±10% of piston groove outside diameter 9, and the design geometry of piston groove 8 was such that at all times during operation, at least 90%±10% of bellcrank piston lobe thickness 11 bore on piston groove wall 50. Thus, this wide bearing surface footprint of bellcrank piston lobe 12 on piston groove wall 50 results in the reduction of wear, and/or the ability to use softer (and thus, less expensive) materials.

Piston groove 8 comprises two opposite piston groove walls 50 separated by piston groove floor 52. In the preferred embodiment, each piston groove wall 50 was a flat annulus, bounded at its inner diameter by piston groove floor 52, and at its outer diameter by piston groove outside diameter 9. At all times during operation, bellcrank piston lobe 12 bears only on piston groove wall 50, never on piston groove floor 52.

Figure 5:
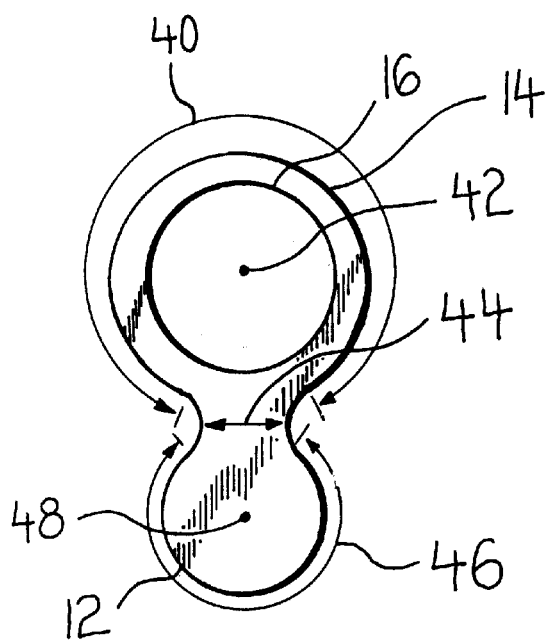
FIG. 5 is an end view of a bellcrank.

FIG. 5 is an end view of bellcrank 10 illustrating the particular geometry which Applicant has discovered is the preferred embodiment of this component. Bellcrank 10 comprises bellcrank piston lobe 12 and bellcrank output shaft lobe 14 mutually attached at bellcrank waist 44. Viewed on end (as depicted in FIG. 5), both bellcrank piston lobe 12 and bellcrank output shaft lobe 14 are largely circular in shape, comprising bellcrank piston lobe arc 46 and bellcrank output shaft lobe arc 40 respectively. Bellcrank piston lobe arc 46 and bellcrank output shaft lobe arc 40 are disposed opposite each other, and each is centered about a line containing bellcrank piston lobe arc center 48 and bellcrank output shaft lobe arc center 42. In the preferred embodiment, the length of bellcrank piston lobe arc 46 was 286°±25°, and the length of bellcrank output shaft lobe arc 40 was 308°±25°.

Another design objective of the instant invention was to provide as great a degree of rotation of output shaft 18 as possible. As may be observed in FIG. 2, the rotation of bellcrank 10 (and consequently, the rotation of output shaft 18) is limited by the interference between bellcrank 10 and piston groove 8. Thus, the inclusion of bellcrank waist 44 in the instant invention serves to maximize the rotation of bellcrank 10 (and output shaft 18) by delaying the angle of rotation of output shaft 18 where such rotation is limited by interference between bellcrank 10 and piston groove 8. In the preferred embodiment, the minimum width of bellcrank waist 44 measured 32%±10% the diameter of bellcrank output shaft lobe arc 40, and 50%±10% the diameter of bellcrank piston lobe arc 46.

In addition, the distance between bellcrank piston lobe arc center 48 and bellcrank output shaft lobe arc center 42 is relevant to the geometry of bellcrank waist 44 and to the objective of delaying interference between piston 4 and bellcrank 10 as much as possible as output shaft 18 rotates. In the preferred embodiment, the distance between bellcrank piston lobe arc center 48 and bellcrank output shaft lobe arc center 42 was 97%±25% the diameter of bellcrank output shaft lobe arc 40, and 150%±25% the diameter of bellcrank piston lobe arc 46.

While a preferred embodiment of the invention has been illustrated herein, it is to be understood that changes and variations may be made by those skilled in the art without departing from the spirit of the appending claims.

DRAWING ITEM INDEX 2 radial bellcrank actuator
4 piston
6 cylinder
7 fluid passage
8 piston groove
9 piston groove outside diameter
10 bellcrank
11 bellcrank piston lobe thickness
12 bellcrank piston lobe
14 bellcrank output shaft lobe
16 bellcrank output shaft bore
18 output shaft
20 seal
22 arrow
24 arrow
26 housing
28 bellcrank recess
30 output shaft bore
32 arrow
34 arrow
36 arrow
38 arrow
40 bellcrank output shaft lobe arc
42 bellcrank output shaft lobe arc center
44 bellcrank waist
46 bellcrank piston lobe arc
48 bellcrank piston lobe arc center
50 piston groove wall
52 piston groove floor
60 L-bar rotary fluid power actuator
62 piston
64 piston groove
66 L-bar
68 output shaft
70 arrow
72 arrow
74 L-bar major leg
76 L-bar minor leg

I claim:

1. A radial bellcrank actuator comprising a piston having a piston groove, and a bellcrank attached to an output shaft, said bellcrank comprising a bellcrank piston lobe sized to rotatably fit into said piston groove, said piston groove being defined by two annular piston groove walls separated by a piston groove floor, said bellcrank piston lobe bearing only on said piston groove walls during operation of said radial bellcrank actuator, whereby reciprocation of said piston causes said bellcrank, and consequently also said output shaft, to rotate.

2. The radial bellcrank actuator of claim 1 wherein said bellcrank further comprises a bellcrank output shaft bore sized to admit said output shaft, whereby said output shaft is attached to said bellcrank.

3. The radial bellcrank actuator of claim 1 wherein at all times during a stroke of said radial bellcrank actuator a minimum of 90%±10% of a thickness of said bellcrank piston lobe bears on one said piston groove walls.

4. The radial bellcrank actuator of claim 1 wherein each said piston groove wall is bounded by said piston groove floor and an outside diameter of said piston groove, a thickness of said bellcrank piston lobe being at least 40%±10% of said piston groove outside diameter.

5. The radial bellcrank actuator of claim 2 wherein an end view shape of said bellcrank piston lobe is an arc of a circle spanning 286°±25°, said bellcrank piston lobe arc being centered on a line connecting a bellcrank piston lobe arc center and a center of said bellcrank output shaft bore.

6. The radial bellcrank actuator of claim 5 wherein an extreme of said bellcrank connected to said output shaft is attached to said bellcrank piston lobe at a bellcrank waist, a maximum width of said bellcrank waist being 50%±10% a diameter of said bellcrank piston lobe arc.

7. The radial bellcrank actuator of claim 5 wherein a distance between said bellcrank piston lobe arc center and said bellcrank output shaft bore center is 150%±25% a diameter of said bellcrank piston lobe arc.

8. The radial bellcrank actuator of claim 1 wherein said bellcrank further comprises a bellcrank output shaft lobe attached to said bellcrank piston lobe at a bellcrank waist, an end view shape of said bellcrank output shaft lobe being an arc of a circle spanning 308°±25°, said bellcrank output shaft lobe arc being centered on a line connecting a center of said bellcrank piston lobe arc and a center of said bellcrank output shaft lobe arc.

9. The radial bellcrank actuator of claim 8 wherein a minimum width of said bellcrank waist is 32%±10% a diameter of said bellcrank output shaft lobe arc.

10. The radial bellcrank actuator of claim 8 wherein a distance between said output shaft lobe arc center and a center of said bellcrank piston lobe is 97%±25% a diameter of said bellcrank output shaft lobe arc.

11. A radial bellcrank actuator comprising a piston having a piston groove, said piston groove being defined by two annular piston groove walls separated by a piston groove floor, and a bellcrank attached to an output shaft, said bellcrank comprising a bellcrank piston lobe attached to a bellcrank output shaft lobe at a bellcrank waist, said piston lobe being sized to rotatably fit into said piston groove, said bellcrank piston lobe bearing only on said piston groove walls during operation of said radial bellcrank actuator, whereby reciprocation of said piston causes said bellcrank, and consequently also said outfit shaft, to rotate.

12. The radial bellcrank actuator of claim 11 wherein said bellcrank further comprises a bellcrank output shaft bore disposed in said bellcrank output shaft lobe, said bellcrank output shaft bore being sized to admit said output shaft, whereby said bellcrank is attached to said output shaft.

13. The radial bellcrank actuator of claim 12 wherein said bellcrank output shaft lobe and said bellcrank piston lobe arc are largely circular in shape when viewed from an end of said bellcrank, a shape of said bellcrank output shaft lobe being an arc spanning 308°±25°, a shape of said bellcrank piston lobe being an arc spanning 286°±25°.

14. The radial bellcrank actuator of claim 13 wherein a width of said bellcrank waist is 50%±10% said bellcrank piston lobe arc diameter, and 32%±10% said bellcrank output shaft lobe arc diameter.

15. The radial bellcrank actuator of claim 14 wherein said piston groove is defined by two annular piston groove walls separated by a piston groove floor, said bellcrank piston lobe bearing only on said piston groove walls.

16. The radial bellcrank actuator of claim 15 wherein at all times during a stroke of said radial bellcrank actuator a minimum of 90%±10% of a thickness of said bellcrank piston lobe bears on one said piston groove walls.

17. The radial bellcrank actuator of claim 16 wherein each said piston groove wall is bounded by said piston groove floor and an outside diameter of said piston groove, a thickness of said bellcrank piston lobe being at least 40%±10% of said piston groove outside diameter.

18. The radial bellcrank actuator of claim 17 wherein a distance between a center of said bellcrank output shaft lobe arc and a center of said bellcrank piston lobe arc is 97%±25% of said bellcrank output shaft lobe arc diameter, and 150%±25% of said bellcrank piston lobe arc diameter.

19. The radial bellcrank actuator of claim 1 wherein when said radial bellcrank actuator is viewed along a centerline of said piston, said bellcrank is disposed substantially along a radius of said piston centerline.

20. The radial bellcrank actuator of claim 11 wherein when said radial bellcrank actuator is viewed along a centerline of said piston, said bellcrank is disposed substantially along a radius of said piston centerline.

* * * * *